Figure 1:
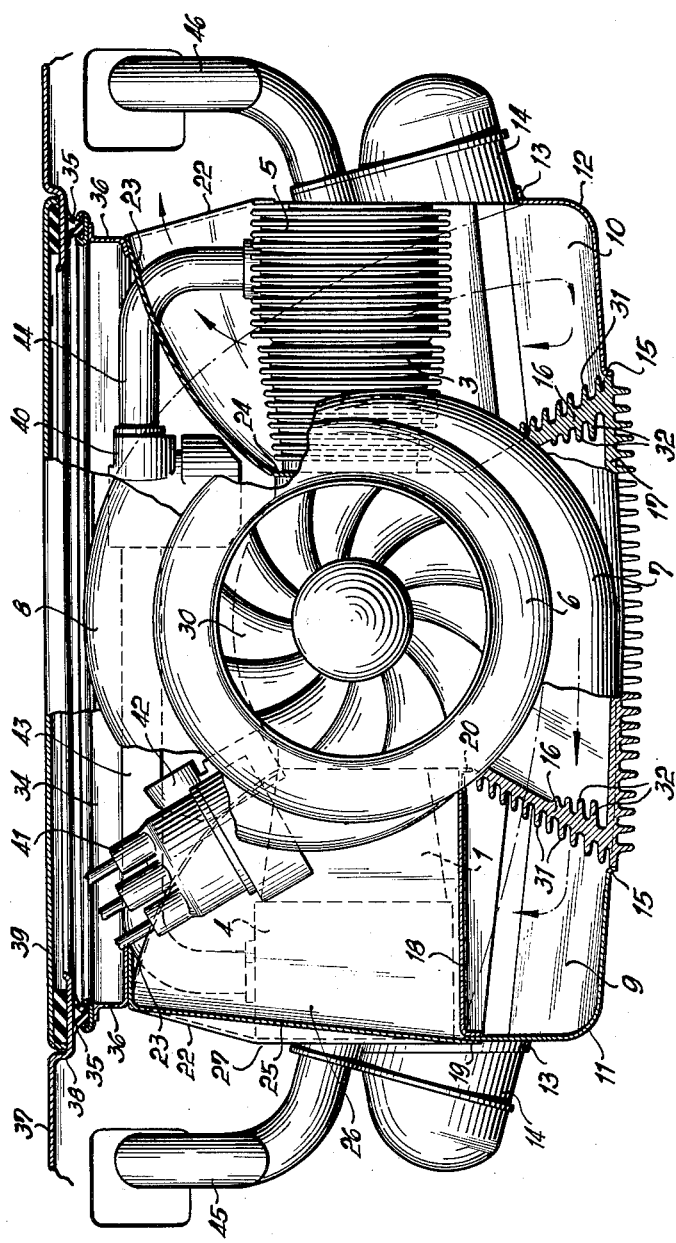

Jan. 23, 1962  E. FORSTNER ET AL  3,017,943
AIR-COOLED MULTI-CYLINDER INTERNAL COMBUSTION ENGINE
Filed May 4, 1959  3 Sheets-Sheet 1

INVENTORS
EGON FORSTNER
AND
ROBERT BINDER
BY
Dicke, Craig and Freudenberg
ATTORNEYS Jan. 23, 1962   E. FORSTNER ET AL   3,017,943
AIR-COOLED MULTI-CYLINDER INTERNAL COMBUSTION ENGINE
Filed May 4, 1959   3 Sheets-Sheet 3

INVENTORS
EGON FORSTNER
AND
ROBERT BINDER
BY
Dicke, Craig and Freudenberg
ATTORNEYS United States Patent Office 3,017,943
Patented Jan. 23, 1962

3,017,943
AIR-COOLED MULTI-CYLINDER INTERNAL COMBUSTION ENGINE
Egon Forstner, Stuttgart-Degerloch, Wurttemberg, and Robert Binder, Stuttgart-Zuffenhausen, Wurttemberg, Germany, assignors to Dr.-Ing. h.c.F. Porsche K.G., Stuttgart-Zuffenhausen, Germany
Filed May 4, 1959, Ser. No. 810,638
Claims priority, application Germany May 31, 1958
11 Claims. (Cl. 180—54)

The present invention relates to an air-cooled, multi-cylinder internal combustion engine particularly for driving a motor vehicle having horizontally disposed rows of cylinders, preferably arranged opposite each other in a boxer-type manner, and a cooling blower or compressor arranged coaxially with the crank shaft of the engine.

The present invention aims at a construction improving the accessibility to an engine of this type as well as at a reduction of the structural elements required for guiding the cooling air to and from the engine and for shielding the motor compartment against the outside.

This is accomplished according to the present invention thereby that the air-duct sheet-metal members or plates provided for guiding the cooling air from the blower to the cylinders of the engine extend below the rows of cylinders and, at the same time, constitute the cover or protecting means for the engine against the road surface whereby additional structural elements, usually required for this purpose may be dispensed with.

In the construction according to the present invention, the air-guiding sheet metal members or plates which extend below the engine cylinders form together with other parts of the engine, especially with portions of the crank case, air-guiding channels or ducts. For the further simplification of the structure in accordance with the present invention, the wall portions of the crank case which, together with the air-guiding sheet metal members, form the air-guiding channels or ducts, are provided on the inside and the outside thereof with cooling ribs or fins. By the use of these ribs or fins, the wall of the crank case becomes effective as a heat exchanger so that a separate oil cooler may be dispensed with for cooling the engine oil.

The air-guiding sheet-metal members are each extended above the cylinders by an additional pressed or stamped sheet metal part which each form a deflecting wall for the discharged cooling-air flowing off into the atmosphere. As a result of such a construction, the spark plug which is disposed at the cooling-air discharge side of the cylinder head is easily accessible. Furthermore, separate cooling-air discharge channels or ducts become superfluous.

Each additional sheet-metal part extends over the entire length of the internal combustion engine and is provided in the region of the cylinders with a depression forming the deflecting walls for discharged cooling-air.

With an internal combustion engine which is covered over its entire length and width by a floor plate that preferably forms a part of the subframe of the motor vehicle, the air guiding sheet-metal members and preferably the additional sheet metal stampings are provided with a web portion which, at the free edge thereof, is provided with a resilient sealing strip or molding that abuts against the floor plate.

Air-guiding parts are used for purposes of sealing the motor compartment in such a construction that are already predominantly existing anyhow. The auxiliary aggregates for the engine such as the carburetor, the distributor and the fuel transfer pump may be conveniently accommodated within the space sealed toward the outside thereof. For better accessibility to the auxiliary aggregates of the engine, the area of the floor plate essentially defined by the sealing strip is made removable.

Accordingly, it is an object of the present invention to provide an air-cooled, multi-cylinder engine which requires the minimum of parts for guiding the cooling air through the engine parts to be cooled thereby.

It is another object of the present invention to provide an air-cooled internal combustion engine in which the auxiliary aggregates or devices of the engine such as carburetor, distributor and fuel pump are easily accessible.

A still further object of the present invention lies therein that the air ducts for guiding the cooling air through an air-cooled internal combustion engine simultaneously provide a protective shield for the engine.

Still another object of the present invention resides in the provision of cooling-air guide-ducts of the air-cooled internal combustion engine which are partly formed by the walls of the engine crank case to thereby become effective as a heat exchanger for the engine oil.

Another object of the present invention resides in the provision of an air-cooled internal combustion engine which obviates the necessity of a special separate engine oil cooler.

A further object of the present invention resides in the provision of an air-cooled internal combustion engine which obviates the necessity of special ducts for discharging the cooling air therefrom.

A still further object of the present invention resides in the provision of a separate engine compartment for an air-cooled internal combustion engine formed by components of the cooling air duct system for housing therein auxiliary engine aggregates.

Figure 2:
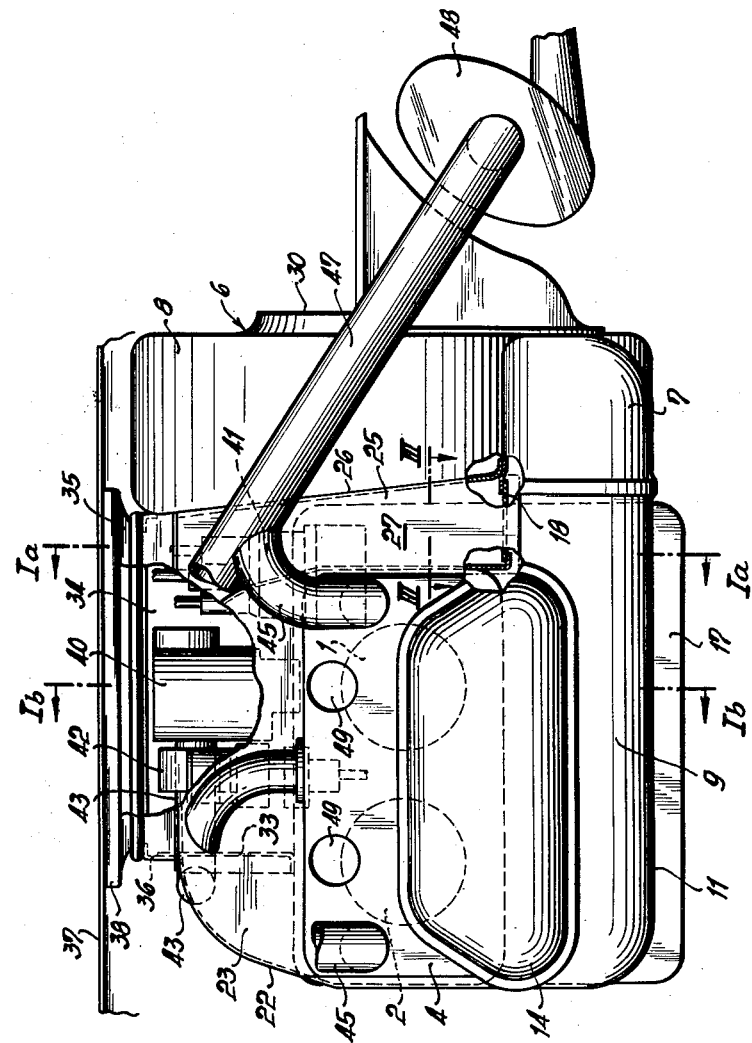
Figure 3:
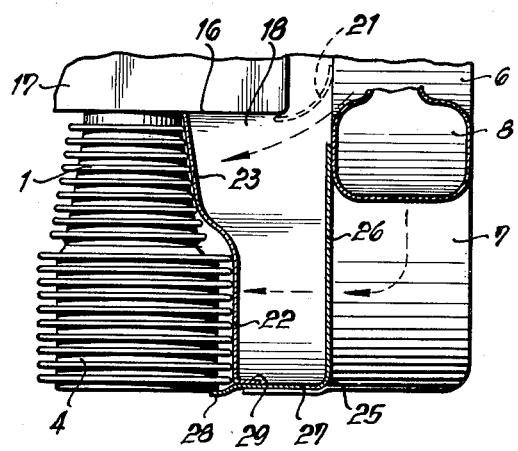

These and other objects, features and advantages of the present invention will become more obvious from the following description when taken in connection with the accompanying drawings which show, for purposes of illustration only, one embodiment in accordance with the present invention and wherein:

FIGURE 1 is an elevational end view of an air-cooled internal combustion engine according to the present invention with rows of cylinders disposed oppositely from each other and wherein the left half of FIGURE 1 shows a cross section through the row of cylinders taken essentially along line $I_a$—$I_a$ of FIGURE 2, while the right half of FIGURE 1 is a cross section in the region of one of the cylinders taken along line $I_b$—$I_b$ of FIGURE 2;

FIGURE 2 shows a side view of the engine of FIGURE 1 with parts thereof shown in cross section, and FIGURE 3 is a cross sectional view taken along lines III—III of FIGURE 2.

Referring now to the drawings, wherein like reference numerals are used throughout the various views to designate like parts, and more particularly to FIGURES 1 and 2, the internal combustion engine according to the present invention comprises two oppositely arranged rows of cylinders including, for instance, cylinders 1, 2 and 3, respectively, cylinders 1 and 3 being shown in FIGURE 1, and cylinders 1 and 2 in FIGURE 2. The fourth cylinder disposed behind cylinder 3 in FIGURE 1 is not visible in any of the views of the drawing. Each row of cylinders is provided with a cylinder head 4 and 5, respectively. A cooling blower or compressor 6 is arranged coaxially with the engine crankshaft (not shown) and is either driven directly by the crankshaft or through a set of gears.

The blower 6 is a radial flow compressor provided with spirally shaped scroll cases 7 and 8 each connected with an air-guide chamber or housing 9 and 10, respectively. These chambers 9 and 10 extend below the horizontally arranged cylinder rows and each consisting essentially of an angular stamping 11 and 12 (FIGURE 1). In the region of the cylinder rows each of these stampings 11, 12 is fastened by means of a flange 13 thereof to a hood-shaped part 14 which is attached to a respective cylinder head and forms a cover for the valve actuating mechanism of the engine.

A further flange 15 provided on each of the stampings 11 and 12 is attached to the inclined side walls 16 of the crank case 17. A stamping 18 each is provided between the cylinders and the scroll cases 7 and 8, shown in cross section in the left portion of FIGURE 1, which is supported at one end thereof by means of a flange 19 thereof on the stamping 11 and on the other end thereof by means of a flange 20 on the crank case 17. Furthermore, the wall 16 of the crank case 17 is connected by means of a stamping 21 each to the scroll case 7 as shown in FIGURE 3.

The two cylinder rows are each surrounded by a stamping 22 as shown in FIGURES 1 and 2 provided with a pocket-shaped portion 23 at the side of the cylinder rows opposite to the air-guiding chambers 9 and 10. The end of the pocket-shaped portion 23 facing the crank case is fastened to the crank case wall by means of flanges 24.

An angular essentially L-shaped stamping 25 is provided between blower 6, for instance, between the scroll case 7 and the corresponding cylinder row, as shown in FIGURE 3, which is supported with one leg 26 thereof on the blower scroll case 7 whereas the other rectangularly bent leg 27 abuts by means of flange 28 thereof on the cylinder head 4. Furthermore, the stamping 22 is fastened to the leg portion 27 of the stamping 25 by means of a flange 29 (FIGURE 3).

The fresh air drawn in through the suction opening 30 of the blower 6 is delivered by the blower 6 through the scroll cases 7 and 8 into the air-guide chambers 9 and 10 respectively whereby the scroll casing 7 supplies compressed air to the air-guide chamber 9 while the scroll case 8 supplies compressed air to the chamber 10.

The air flows, as illustrated by the arrows shown in FIGURES 1 and 3 from the scroll case 7 into the air-guide chamber 9, flows therethrough in an axial direction and is thereby effectively brought below the cylinders 1, 2 and the cylinder head 4. The air in turn flows thereupon upwardly in a vertical direction past the cylinders 1 and 2 and cylinder head 4 and is subsequently deflected into the atmosphere by means of the pocket-shaped part 23 of the stamping 22.

The flow of the cooling air past the oppositely arranged cylinder row takes place in a manner similar to that just described and is indicated by the arrows shown in the right hand section of FIGURE 1.

The longitudinal walls 16 of the crank case 17 which together with the stampings 11 and 12 respectively form the air-guide chambers 9 and 10 are provided on both sides thereof with cooling ribs or fins as shown in FIGURE 1. As a result thereof, the oil in the crank case 17 is effectively and advantageously cooled by the cooling air passing along these ribs through these chambers 9 and 10. In order to improve the cooling effect for the crank case oil, the oil in the crank case may be agitated, that is, kept in motion, by means of a conventional stirring device such as, for instance, a gear wheel of the valve control gear. The colder and warmer parts of the oil are thereby continuously mixed so that a separate oil cooler may be dispensed with.

At the end of the internal combustion engine opposite the cooling blower, a further stamping 33 (FIGURE 2) is provided which extends transversely to the engine between the stampings 22 of each cylinder row. This stamping 33 is fastened at the ends thereof to the crank case 16 and the stampings 22 in any suitable manner, for example, by means of appropriate flanges.

A trough-shaped space 34 shielded toward the outside thereof is formed by the individual stampings, that is, by the walls 33, 22, 26 and 27 which are provided at each row of cylinders as well as by the blower 6. The trough-like space or chamber 34 forms the engine compartment in which the individual auxiliary aggregates may be housed. The aforementioned wall portions 33, 22, 26 and 27 are provided at the free edges thereof with a continuous flanged web portion 36 having a seal 35 which abuts against a frame-shaped member 37 (FIGURES 1 and 2) of the motor vehicle. The frame-shaped member 37 is provided with a channel-shaped portion 38 for accommodating therein a removable cover 39. By removing the cover 39 the auxiliary aggregates of the engine disposed below the cover 39 such as carburetor 40, distributor 41 and fuel transfer pump 42 are laid bare and are thereby rendered readily accessible.

The carburetor 40 is operatively connected with the individual rows of cylinders by means of pipes or lines 43 and 44. The exhaust lines or pipes 45 and 46 of each row of cylinders converge into a common manifold 47 as shown in FIGURE 2 which in turn leads to an exhaust muffler 48. The exhaust muffler 48 is arranged ahead of the blower 6.

For mounting and suitably installing the spark plugs, each cylinder head 4, 5 is provided with corresponding bores 49 which are disposed at the cooling-air exit side of the cylinder head and into which the individual spark plugs are inserted.

While we have shown and described one embodiment in accordance with the present invention, it is understood that the same is not limited thereto but is susceptible of many changes and modifications within the spirit and scope of the present invention and we, therefore, do not wish to be limited to the details shown and described herein but intend to cover all such changes and modifications as encompassed by the scope of the appended claims.

What is claimed is:

1. An air-cooled internal combustion engine with a crankshaft, particularly for motor vehicles, comprising crank case means, engine cylinders disposed laterally of said crankshaft, cooling air blower means to provide air for cooling said cylinders, duct means for guiding cooling air past said cylinders, said duct means including first duct means located substantially below said blower means to receive air discharged by said blower means, said first duct means including first wall means disposed below said cylinders and simultaneously forming means for protecting said engine against dirt and particles thrown thereagainst from the road, second duct means effectively forming a continuation of said first duct means to pass cooling air upwardly past said cylinders, and third duct means above said second duct means including further wall means extending angularly to the direction of cooling air flow in said second duct means to deflect cooling air which has passed said cylinders to the atmosphere.

2. An air-cooled internal combustion engine according to claim 1, further including additional wall means above said third duct means and connected thereto whereby a chamber to receive auxiliary engine aggregates is formed therebetween, said additional wall means being provided with an inlet opening to said chamber, and a cover plate adapted to close said inlet opening.

3. An air-cooled internal combustion engine according to claim 1, wherein said engine cylinders comprise a plurality of cylinders disposed on each side of said crankshaft in an essentially horizontal direction.

4. An air-cooled internal combustion engine according to claim 1, wherein said first wall means are disposed below said cylinders and are attached to wall portions of said crank case means to thereby form air guide channels.

5. An air-cooled internal combustion engine according to claim 4, wherein said wall portions of said crank case means are provided with cooling ribs at the inside and outside thereof.

6. An air-cooled internal combustion engine according to claim 1, wherein said further wall means extends over the entire length of said engine and is provided above the region of said cylinders with pocket-shaped portions.

7. An air-cooled multi-cylinder internal combustion engine with a crankshaft, particularly for motor vehicles including a vehicle body structure, comprising crank case means, opposed cylinder means disposed essentially horizontally and on opposite sides of said crankshaft, cooling air blower means including duct means for guiding the cooling air past said cylinder means, said blower means being disposed substantially coaxially with respect to said crankshaft and being operatively connected therewith, said duct means including first wall means disposed below said cylinder means and further wall means disposed above said cylinder means and forming a continuation of said first wall means and including deflector wall means for directing said cooling air past said cylinders from below thereof and in a direction essentially perpendicular to the axes thereof and whence to the atmosphere, said vehicle body structure including a floor plate provided with an opening therein essentially the size of the length and width of said engine, the edges of said opening being shaped as trough-like depressions and a cover plate for covering said opening, said further wall means including a web portion provided at the free edge portions thereof with resilient sealing means abutting against said trough-like depressions to provide a seal between said floor plate and said further wall means.

8. An air-cooled internal combustion engine according to claim 7 including auxiliary aggregates, wherein said floor plate together with said further wall means form a chamber sealed toward the outside thereof by said sealing means for accommodating therein the engine auxiliary aggregates including a carburetor, a distributor and a fuel-transfer pump.

9. An air-cooled multi-cylinder internal combustion engine according to claim 7, wherein said cover plate is provided with further sealing means and is removable.

10. An air-cooled internal combustion engine with a crankshaft, particularly for motor vehicles, comprising crank case means, engine cylinders disposed laterally of said crankshaft, cooling air blower means to provide air for cooling said cylinders, duct means for guiding cooling air past said cylinders, said duct means including first duct means located substantially below said blower means to receive air discharged by said blower means, said first duct means including first wall means disposed below said cylinders and simultaneously forming means for protecting said engine against dirt and particles thrown thereagainst from the road, second duct means effectively forming a continuation of said first duct means to pass cooling air upwardly past said cylinders, and third duct means effectively forming a continuation of said second duct means to vent cooling air to the atmosphere.

11. In an air-cooled internal combustion engine with a crankshaft, particularly for motor vehicles, comprising crank case means, engine cylinders disposed laterally of said crankshaft, cooling air blower means to provide air for cooling said cylinders, duct means for guiding cooling air past said cylinders, said duct means including first duct means located substantially below said blower means to receive air discharged by said blower means, second duct means effectively forming a continuation of said first duct means to pass cooling air upwardly past said cylinders, and third duct means above said second duct means including a wall portion extending transversely to the direction of cooling air flow in said second duct means to deflect cooling air which has passed said cylinders outwardly to the atmosphere.

References Cited in the file of this patent

FOREIGN PATENTS

| | | |
|---|---|---|
| 1,080,371 | France | May 26, 1954 |
| 407,675 | Great Britain | Mar. 14, 1934 |
| 108,867 | Sweden | Oct. 26, 1943 |